US005201341A

United States Patent [19]

Saito et al.

[11] Patent Number: 5,201,341

[45] Date of Patent: Apr. 13, 1993

[54] ELECTROMAGNETIC TYPE FLUID FLOW CONTROL VALVE

[75] Inventors: Kimitaka Saito, Nagoya; Tatsuyoshi Matsumoto, Okazaki; Toshihiko Igashira, Toyokawa, all of Japan

[73] Assignee: Nippon Soken, Inc., Nishio, Japan

[21] Appl. No.: 852,946

[22] Filed: Mar. 17, 1992

[30] Foreign Application Priority Data

Mar. 19, 1991 [JP] Japan .................................. 3-054931
Dec. 27, 1991 [JP] Japan .................................. 3-346707

[51] Int. Cl.$^{5}$ ........................ F16K 49/00; F02M 51/00

[52] U.S. Cl. ................................ 137/341; 251/129.21; 251/129.01; 123/557

[58] Field of Search ................................ 137/338, 341; 251/129.21, 129.01; 123/557

[56] References Cited

U.S. PATENT DOCUMENTS 3,601,110 8/1971 Kamazuka .
3,915,193 10/1975 Rutt ...................................... 137/341
4,934,907 6/1990 Kröner ............................ 123/557 X

FOREIGN PATENT DOCUMENTS 49-45249 12/1974 Japan .
49-45250 12/1974 Japan .

*Primary Examiner*—Arnold Rosenthal
*Attorney, Agent, or Firm*—Cushman, Darby & Cushman

[57] ABSTRACT

A fluid flow control valve comprises a fluid heating device for supplying a heat energy to a fluid, a valve device for controlling a flow rate of the fluid, an electromagnetic coil for generating a magnetic field at the fluid heating device and the valve device so that the fluid heating device is heated to supply the heat energy to the fluid and the valve device is operated to control the flow rate of the fluid, and a power source for applying a voltage to the electromagnetic coil to generate the magnetic field, the power source supplying a current whose value fluctuates to the electromagnetic coil when the fluid heating device supplies the heat energy to the fluid.

14 Claims, 5 Drawing Sheets

ELECTROMAGNETIC TYPE FLUID FLOW CONTROL VALVE

BACKGROUND OF THE INVENTION

The present invention relates to an electromagnetic type fluid flow control valve in which a fluid to be controlled is heated by a variation of magnetic field strength.

Each of Publications of Japanese Patent 49-45249 and Japanese Patent 49-45250 discloses a prior-art fuel injector which includes an induction heating apparatus to supply a heated fuel to an internal combustion engine of automobile. In the prior-art fuel injector, an electromagnetic heater coil is mounted on a forward end of the fuel injector and a high-frequency alternating current is supplied to the electromagnetic heater coil to heat the fuel injected from the fuel injector so that a vaporization of the fuel is accelerated for an easy engine start in a cold condition, a decrease in fuel consumption and a decrease in harmful substance in exhaust gas. The prior-art fuel injector includes the electromagnetic heater coil for heating the fuel injector and the injected fuel, and the prior-art fuel injector further includes an electromagnetic solenoid coil for driving a valve needle by which a fuel flow is controlled. That is, the prior-art fuel injector includes a plurality of electromagnetic coils.

SUMMARY OF THE INVENTION

An object of the present invention is to provide a fluid flow control valve in which a fluid to be controlled is heated by a variation of magnetic field strength through a simple structure.

According to the present invention, a fluid flow control valve comprises a fuel heating means for supplying a heat energy to a fluid, a valve means for controlling a flow rate of the fluid, an electromagnetic coil for generating a magnetic field at the fuel heating means and the valve means so that the fuel heating means is heated to supply the heat energy to the fluid and the valve means is operated to control the flow rate of the fluid, and a power source for applying a voltage to the electromagnetic coil to generate the magnetic field by a current caused by the applied voltage, the power source supplying the current whose value fluctuates to the electromagnetic coil when the fuel heating means supplies the heat energy to the fluid.

Since the electromagnetic coil generates the magnetic field so that the fuel heating means is heated to supply the heat energy to the fluid and the valve means is operated to control the flow rate of the fluid, the power source applies the voltage to the electromagnetic coil to generate the magnetic field, and the power source supplies the current whose value fluctuates to the electromagnetic coil when the fuel heating means supplies the heat energy to the fluid, both of the supply of the heat energy to the fluid and the flow rate of the fluid can be controlled by one electromagnetic coil.

DETAILED DESCRIPTION OF PREFERRED EMBODIMENTS

Figure 1:
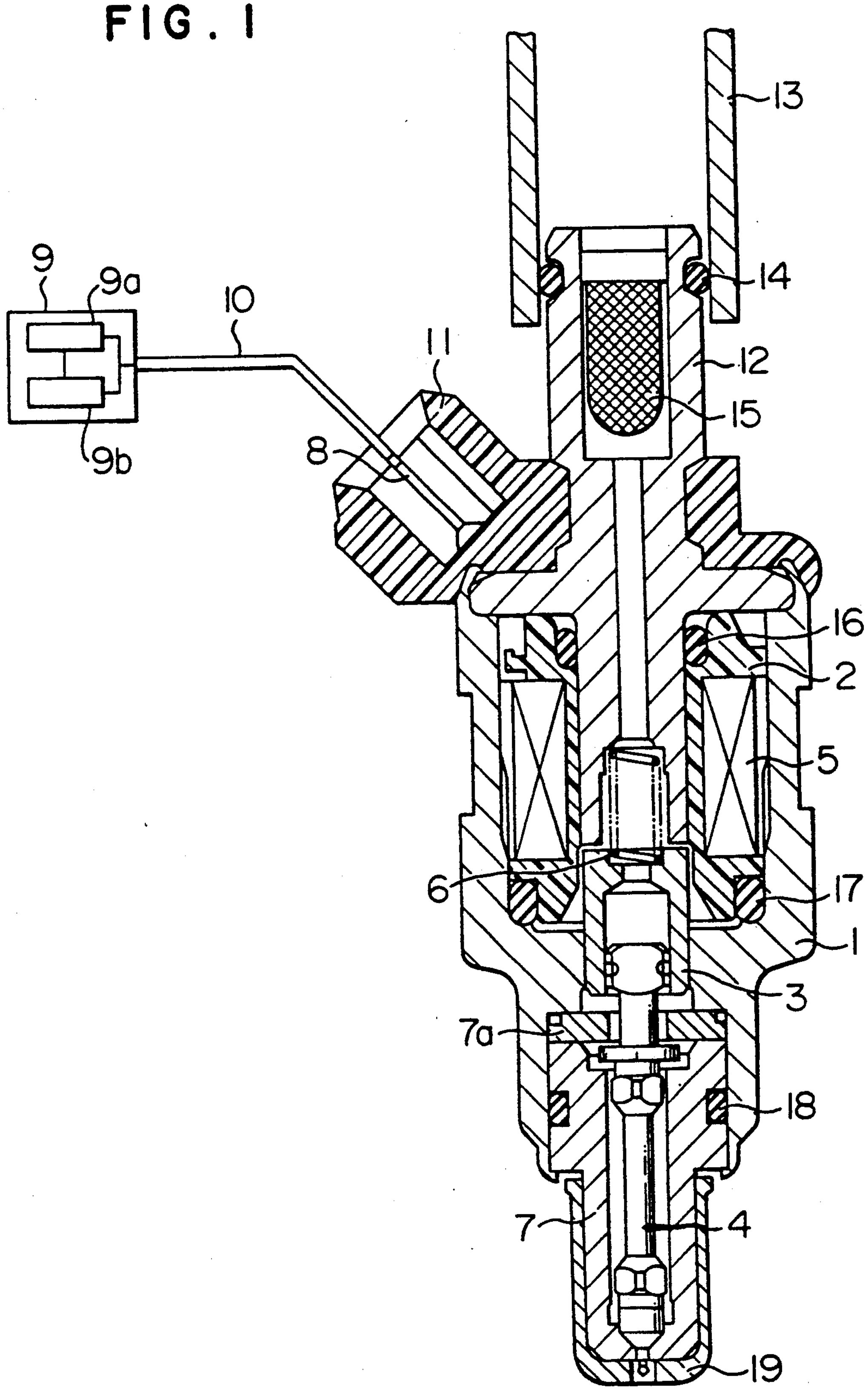
FIG. 1 is a cross-sectional view showing an embodiment of the present invention.

As shown in FIG. 1, a fluid flow control valve according to the present invention, has a valve housing 1 made of a magnetically permeable material, a bobbin 2 made of a non-magnetically-permeable material and received by the valve housing 1, an electromagnetic coil 5 wound on the bobbin 2, and an iron core 3 which is movable in the valve housing 1 and is joined with a needle 4. A nozzle body 7 is mounted on a forward end of the valve housing 1 with a spacer 7*a* therebetween. The needle 4 extends through the spacer 7*a* and is supported by an inner circumferential surface of the nozzle body 7. A forward end of the needle 4 can close an injection opening formed at a forward end of the nozzle body 7. A combination of the needle 4 and the iron core 3 is urged toward the nozzle body 7 by a return spring 6. The electromagnetic coil 5 is electrically connected to a terminal 8 so that the electromagnetic coil 5 is electrically connected to a driver circuit 9 for the fluid flow control valve through a lead line 10. The driver circuit 9 includes an injection rate control circuit 9*a* and a fluctuating current supply circuit 9*b*. The injection rate control circuit 9*a* calculates a timing of fluid injection on the basis of values measured by, for example, an engine rotational speed sensor, an intake air sensor and so forth so that the current is supplied to the electromagnetic coil 5 at the calculated timing and during a time period determined according to an amount of fluid to be injected. The fluctuating current supply circuit 9*b* supplies a current whose value fluctuates to the electromagnetic coil 5 when the injection rate control circuit 9*a* does not supply the current to the electromagnetic coil 5. The terminal 8 is held on a housing 11 made of an electrically insulant material. A fluid path tube 12 is made of a magnetically permeable material, for example, iron and is fixed to the valve housing 1 in the bobbin 2. Reference numerals 14, 16, 17 and 18 indicate O-rings for sealing, and a cap 19 protects the nozzle body 7. A pressurized fluid is supplied into the fluid flow control valve through a pipe 13 and a filter 15.

When a magnetic force for moving the combination of the needle 4 and the iron core 3 by a magnetic field generated by the electromagnetic coil 5 is more than a total amount of a frictional force generated between the combination of the needle 4 and iron core 3 and surfaces contacting with the combination, a return force of the return spring 6 and so forth, the combination of the needle 4 and the iron core 3 is moved by the generated magnetic field to control the fluid flow according to a strength degree of the generated magnetic field so that the fluid flow control valve is operated. When the magnetic force is less than the total amount, the combination of the needle 4 and the iron core 3 is not moved by the generated magnetic field so that the fluid flow control valve cannot be operated to control the fluid flow according to the strength degree of the generated magnetic field.

Figure 2:
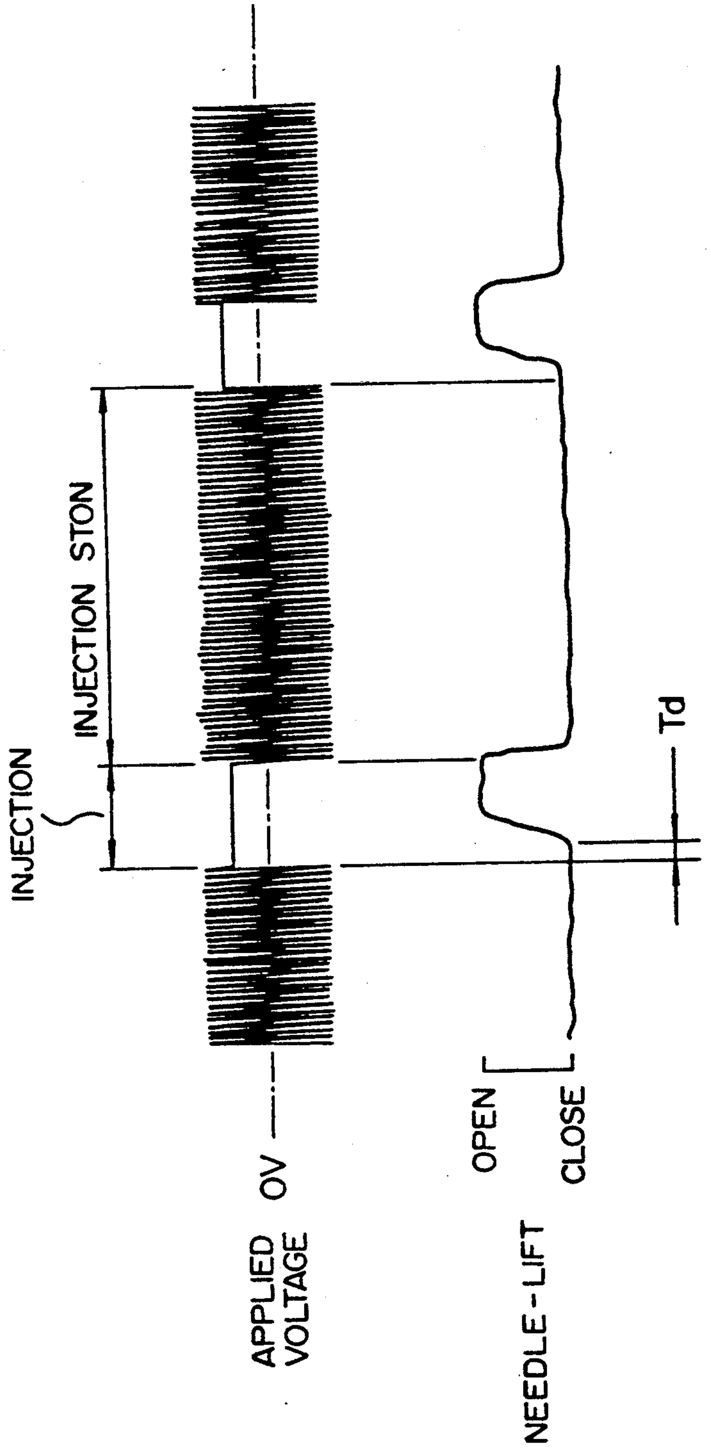
FIG. 2 is a diagram showing a relation between a voltage applied to an electromagnetic coil of the present invention and a time, that is, a voltage variation relative to time.

As shown in FIG. 2, when the fluid is injected from the fluid flow control valve without heating the injected fluid, a voltage whose value substantially does not fluctuate or is substantially constant is supplied to the electromagnetic coil 5 so that the current flowing in the electromagnetic coil 5 generates the magnetic field whose value substantially does not fluctuate or is substantially constant. Therefore, the combination of the needle 4 and the iron core 3 is drawn toward the fluid path tube 12 to form a clearance between the needle 4 and the nozzle body 7 so that the pressurized fluid without being heated flows out from the clearance to the outside of the fluid flow control valve.

A response delay Td between a start of supplying voltage to the electromagnetic coil 5 and a start of drawing the needle 4 toward the fluid path tube 12 is caused by an electromagnetic response delay determined by an inductance of the electromagnetic coil 5, the return force of the return spring 6, the frictional force and an inertia of the combination of the needle 4 and the iron core 3.

When the fluid is not injected from the fluid flow control valve and the injected fluid is heated by the generated magnetic field, a voltage whose value fluctuates or is not constant and whose effective value is not sufficient for making the magnetic force for moving the combination of the needle 4 and the iron core 3 more than the total amount of the frictional force generated between the combination of the needle 4 and iron core 3 and the surfaces contacting with the combination, the return force of the return spring 6 and so forth is supplied to the electromagnetic coil 5 so that the current flowing in the electromagnetic coil 5 generates the magnetic field whose value fluctuates to heat the fluid and the combination of the needle 4 and the iron core 3 is not drawn toward the fluid path tube 12 by the generated magnetic field to prevent the fluid injection. In order for the effective value of the voltage applied to the electromagnetic coil 5 to be made insufficient for making the magnetic force for moving the combination of the needle 4 and the iron core 3 more than the total amount of the frictional force generated between the combination of the needle 4 and iron core 3 and the surfaces contacting with the combination, the return force of the return spring 6 and so forth to prevent a movement of the combination of the needle 4 and the iron core 3, it is advisable that the effective value of the voltage is kept substantially zero and/or a half of cycle of supplying alternating voltage to the electromagnetic coil 5 is less than Td and/or the absolute value of the voltage is kept small. That is, the voltage value applied to the electromagnetic coil 5 is decreased before the combination of the needle 4 and iron core 3 starts to be drawn toward the fluid path tube 12 or is kept insufficient for drawing the combination of the needle 4 and iron core 3 toward the fluid path tube 12.

When the fluctuating voltage is applied to the electromagnetic coil 5, the fluctuating current flows in the electromagnetic coil 5 so that a magnetic field whose strength fluctuates is generated in the fluid path tube 12. Since a material of the fluid path tube 12 has a large iron loss or hysteresis loss and/or a small electrical resistance for a large eddy current loss, the fluid path tube 12 is effectively heated by the fluctuating magnetic field. A heat energy generated in the fluid path tube 12 is transmitted to the fluid flowing in the fluid path tube 12 so that the heated fluid flows out from the fluid flow control valve when the needle 4 is drawn. In order to increase a strength of the generated magnetic field in the fluid path tube 12, the valve housing 1 surrounding the fluid path tube 12 to connect magnetically an end of the fluid path tube 12 to another end of thereof is made of a high-magnetic-permeability and low-hysteresis-loss material, for example, ferrite.

Figure 3:
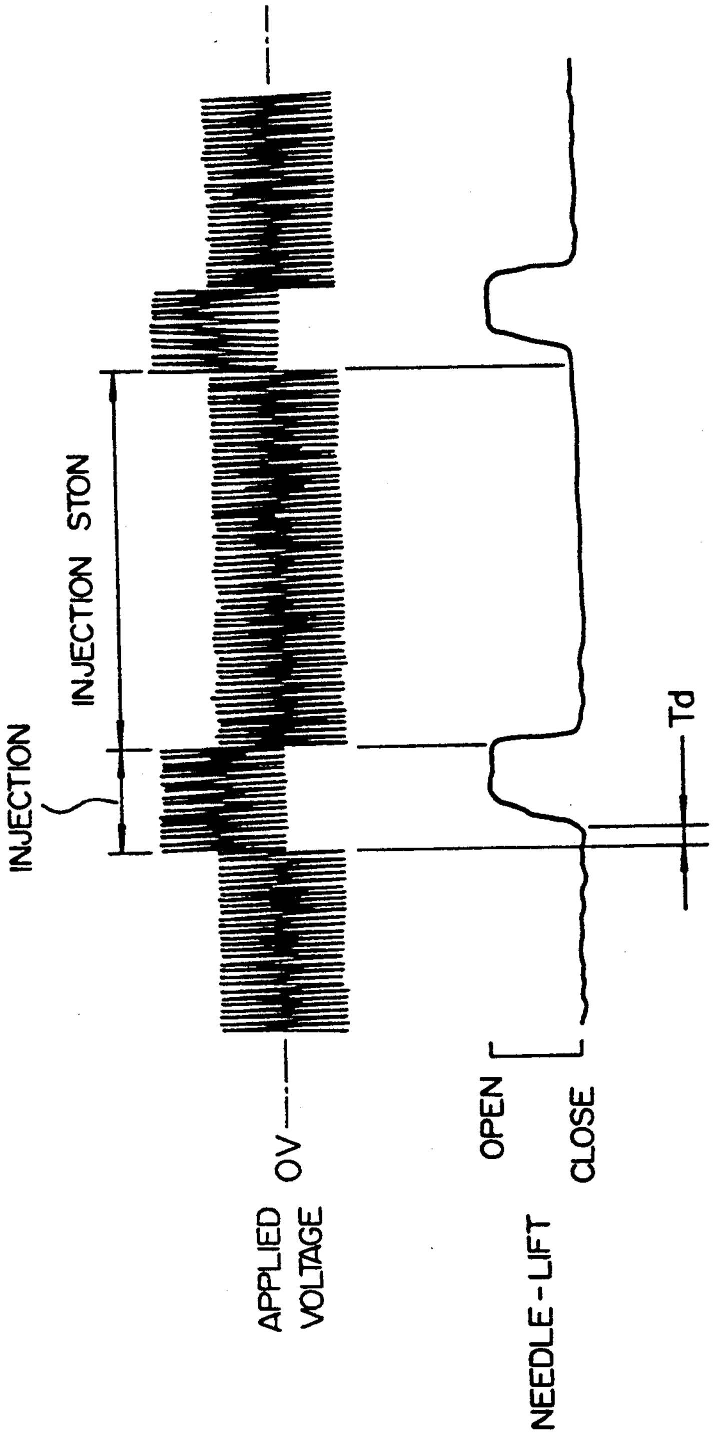
FIG. 3 is a diagram showing another relation between a voltage applied to an electromagnetic coil of the present invention and a time, that is, another voltage variation relative to time.

As shown in FIG. 3, when the fluid is injected from the fluid flow control valve and the fluid is heated by the magnetic field, a voltage whose valve fluctuates or is not constant and whose effective value is sufficient for making the generated magnetic force for moving the combination of the needle 4 and the iron core 3 more than the total amount of the frictional force generated between the combination of the needle 4 and iron core 3 and the surfaces contacting with the combination, the return force of the return spring 6 and so forth is supplied to the electromagnetic coil 5 so that the current flowing in the electromagnetic coil 5 generates the magnetic field whose value fluctuates to heat the fluid and the combination of the needle 4 and the iron core 3 is drawn toward the fluid path tube 12 by the generated magnetic field to form the fluid injection. The voltage whose value fluctuates and whose effective value is sufficient for making the generated magnetic force for moving the combination of the needle 4 and the iron core 3 more than the total amount may be composed of a fluctuating voltage component and a constant voltage component.

Figure 4:
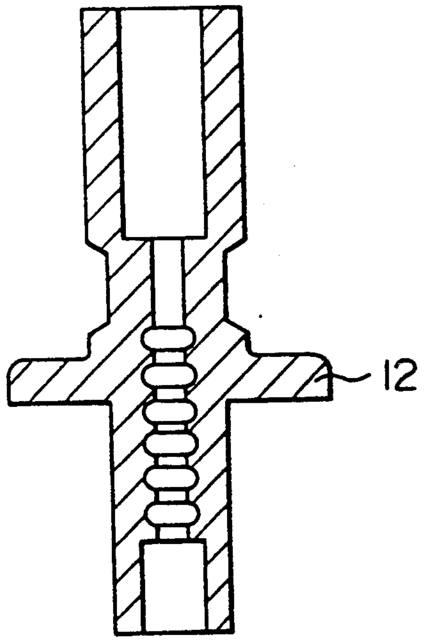
FIG. 4 is a cross-sectional view showing a modification of a fuel path tube.

The fluid path tube 12 may be replaced by a fluid path tube 32 whose inner surface forming the fluid path has a plurality of curvatures as shown in FIG. 4, so that an area of the inner surface contacting with the fluid is increased and the heat energy generated in the fluid path tube 32 is effectively transmitted to the fluid.

Figure 5:
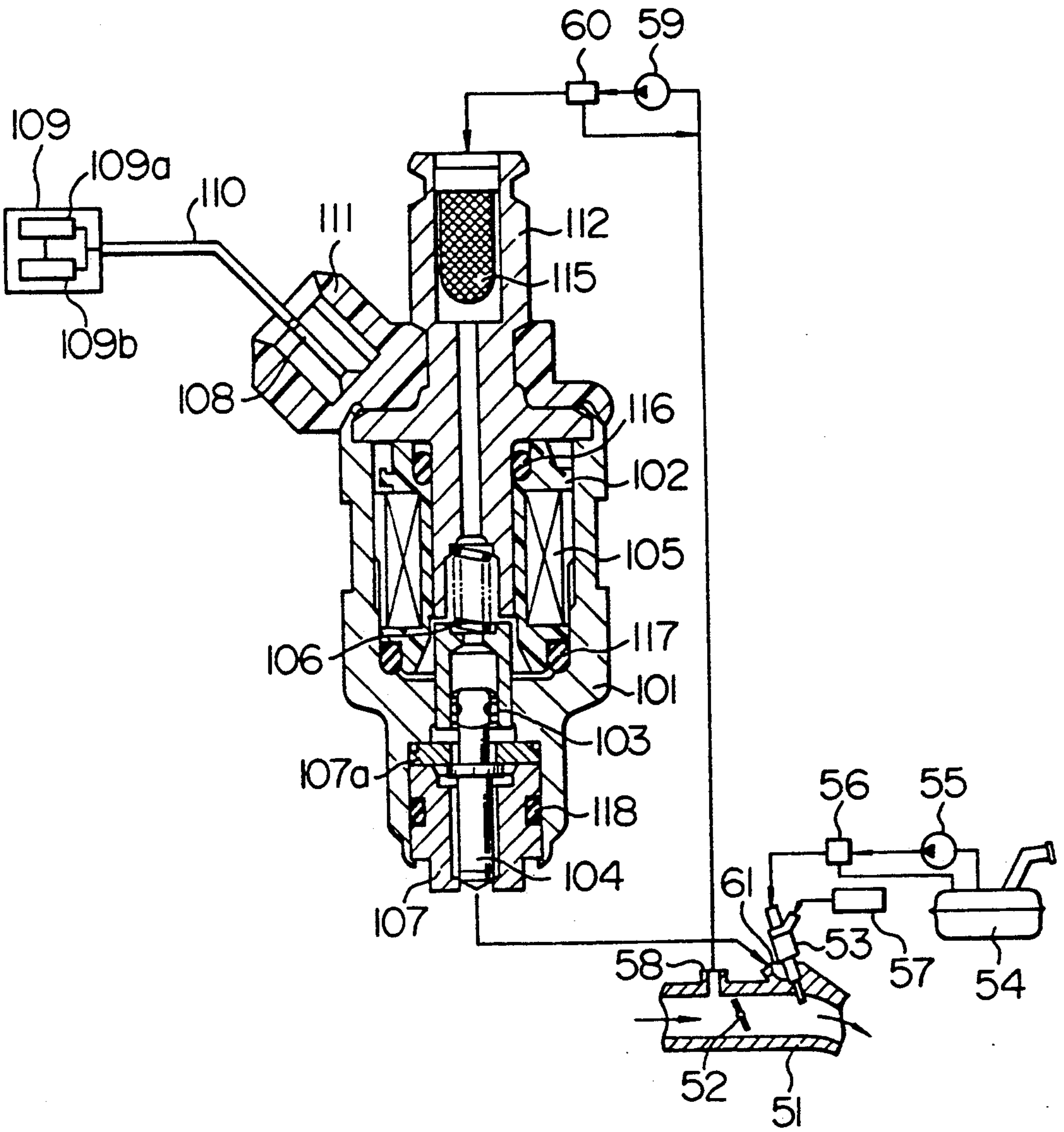
FIG. 5 is a cross-sectional view showing another embodiment of the present invention.

As shown in FIG. 5, the fluid flow control valve according to the present invention may be mounted on a supplemental air path of an internal combustion engine system to control a supplemental air flow mixed with a fuel. A valve housing 101 made of a magnetically permeable material receives a bobbin 102 made of a non-magnetically-permeable material. An electromagnetic coil 105 is wound on the bobbin 102. An iron core 103 is movable in the valve housing 101 and is jointed with a needle 104. A nozzle body 107 is mounted on the valve housing 101 with a spacer **107*a* therebetween. The needle 104 extends through the spacer 107*a* and is supported on an inner circumferential surface of the needle body 107. A forward end of the needle 104 can close and open an air outlet formed at a forward end of the nozzle body 107. A combination of the needle 104 and the iron core 103 is urged toward the nozzle body 107 by a return spring 106. The electromagnetic coil 105 is electrically connected to a terminal 108 so that the electromagnetic coil 105 is controlled by an air flow control valve driver circuit 109 through a lead line 110. The driver circuit 109 includes an air flow control circuit 109*a* and a fluctuating current heater circuit 109*b***.

The air flow control circuit **109*a* supplies a driving current to the air flow control valve to inject the fuel when an air is needed to be supplied to accelerate atomization of the injected fuel. The fluctuating current heater circuit 109*b* supplies a fluctuating current to the electromagnetic coil 105** when the driving current is not supplied.

The terminal 108 is held in a housing 111 made of an electrically insulating material. An air path tube 112 is made of iron with a magnetical permeability, a high hysteresis or iron loss characteristic and a low electrical resistance. The air path tube 112 is received by the bobbin 102 to be fixed to the housing 101. Reference numerals 115, 117 and 118 indicates O-rings for sealing, and a cap 119 protects the nozzle body 107. A throttle valve 52 is mounted on a combustion engine intake manifold 51, and a fuel injector 53 is arranged at a downstream side of the throttle valve 52 in an air flow direction to inject the fuel into the intake manifold 51. The fuel in a fuel tank 54 is pressurized by a fuel pump 55 and a pressure of the fuel is kept at a predetermined degree by a fuel pressure regulator 56 to be supplied to the fuel injector 53. The fuel injector 53 is controlled by a control circuit 57 so that the fuel is injected with a predetermined timing and by an amount determined according to a condition of the internal combustion engine. The air from an air inlet 58 arranged at an upstream side of the throttle valve 52 in the air flow direction is pressurized by an air compressor 59, and subsequently a pressure thereof is adjusted at a predetermined degree by an air pressure regulator 60 so that the pressure controlled air is supplied to the air path tube 112. The air from the air flow control valve is supplied to a supplemental air inlet 61 formed in the intake manifold 51. The supplemental air inlet 61 communicates fluidally with a downstream side of a fuel injection opening of the fuel injector 53 so that a supplemental air is injected into the intake manifold 51 together with the fuel. The pressurized and injected supplemental air collides with the fuel injected from the fuel injector 53 to accelerate a generation of fine fuel mist and the atomization of the injected fuel, so that a desirable mixture of the fuel and air is supplied to the internal combustion engine for a desirable combustion condition thereof.

The fluctuating current is supplied from the fluctuating current heater circuit 109*b* to the air flow control valve to be heated. Therefore, water in the supplemental air is prevented from freezing in the air flow control valve and an operation stop of the air flow control valve does not occur. Alternatively, ice in the air flow control valve can be melted by heat energy generated by the fluctuating current in the air path tube 112, even if the ice is made during an engine stoppage. As described above, the present invention may be applied to a top-feed type fuel injector, alternatively, the present invention may be also applied to a bottom-feed type fuel injector. The fluctuating current may be supplied only in a predetermined time period, for example, when the engine is started in a cold circumferential condition, so that an unnecessary degree of vaporization of the fuel by an undesirable degree of temperature increase of the fuel is prevented, and a decrease of the fluctuating current by an undesirable degree of temperature increase of the electromagnetic coil is prevented.

What is claimed is:

1. A fluid flow control valve comprising:
   - a fluid heating means for supplying a heat energy to a fluid,
   - a valve means for controlling a flow rate of the fluid,
   - an electromagnetic coil for generating a magnetic field at the fluid heating means and the valve means so that the fluid heating means can be heated by a fluctuation of magnetic flux to supply the heat energy to the fluid and the valve means can be operated to control the flow rate of the fluid, and
   - a power source for applying a voltage to the electromagnetic coil to generate the magnetic field, a voltage value being supplied to the electromagnetic coil fluctuating when the fluid heating means supplies the heat energy to the fluid and the voltage supplied to the electromagnetic coil being adjustable to control the flow rate of the fluid in the valve means.

2. A fluid flow control valve according to claim 1, wherein the and an effective value of the voltage applied to the electromagnetic coil is small so as to be insufficient for operating the valve means when the fluid heating means supplies the heat energy to the fluid and the valve means is not operated.

3. A fluid flow control valve according to claim 1, wherein the and an effective value of the voltage applied to the electromagnetic coil is large so as to be sufficient for operating the valve means when the fluid heating means supplies the heat energy to the fluid and the valve means is operated.

4. A fluid flow control valve according to claim 1, wherein a value of the voltage applied to the electromagnetic coil is substantially constant when the fluid heating means does not supply the heat energy to the fluid.

5. A fluid flow control valve according to claim 1, wherein a value of the voltage applied to the electromagnetic coil is substantially constant and an effective value of the voltage is large so as to be sufficient for operating the valve means when the fluid heating means does not supply the heat energy to the fluid and the valve means is operated.

6. A fluid flow control valve according to claim 1, wherein an effective value of the voltage applied to the electromagnetic coil is substantially zero when the fluid heating means supplies the heat energy to the fluid and the valve means is not operated.

7. A fluid flow control valve according to claim 1, wherein the fluid heating means has a magnetic permeability.

8. A fluid flow control valve according to claim 1, wherein the fluid heating means has a hysteresis loss characteristic.

9. A fluid flow control valve according to claim 1, wherein the fluid heating means has an electrically conductive characteristic.

10. A fluid flow control valve according to claim 1, wherein the valve means includes a solenoid driven by the electromagnetic coil.

11. A fluid flow control valve according to claim 1, wherein the power source supplies voltage pulses to the electromagnetic coil, and a value of current supplied to the electromagnetic coil in a period of time of each of the voltage pulses does not become sufficiently large enough to operate the valve means, when the fluid heating means supplies the heat energy to the fluid and the valve means is not operated.

12. A fluid flow control valve according to claim 1, wherein the fluid heating means is heated with a magnetic hysteresis loss.

13. A fluid flow control valve according to claim 1, wherein the fluid heating means is heated with an eddy current loss.

14. A fluid flow control valve according to claim 1, wherein the fluid heating means is heated with a magnetic hysteresis loss and an eddy current loss.

* * * * *